(12) United States Patent
Krockauer et al.

(10) Patent No.: US 12,473,026 B2
(45) Date of Patent: Nov. 18, 2025

(54) METHOD FOR OPERATING A SOIL PROCESSING MACHINE

(71) Applicant: Hamm AG, Tirschenreuth (DE)

(72) Inventors: Rainer Krockauer, Plößberg (DE); Gerhard Mahler, Windischeschenbach (DE); Christian Würner, Tirschenreuth (DE); Klaus Meindl, Bärnau (DE)

(73) Assignee: HAMM AG, Tirschenreuth (DE)

( * ) Notice: Subject to any disclaimer, the term of this patent is extended or adjusted under 35 U.S.C. 154(b) by 277 days.

(21) Appl. No.: 18/127,836

(22) Filed: Mar. 29, 2023

(65) Prior Publication Data

US 2023/0311982 A1    Oct. 5, 2023

(30) Foreign Application Priority Data

Apr. 1, 2022 (DE) .................. 10 2022 107 761.6

(51) Int. Cl.
| | |
|---|---|
| *E02D 3/026* | (2006.01) |
| *B62D 6/00* | (2006.01) |
| *B62D 12/00* | (2006.01) |
| *B62D 15/02* | (2006.01) |
| *E01C 19/26* | (2006.01) |
| *E02D 3/02* | (2006.01) |

(52) U.S. Cl.
CPC .............. *B62D 12/00* (2013.01); *B62D 6/001* (2013.01); *E01C 19/26* (2013.01); *E02D 3/02* (2013.01)

(58) Field of Classification Search
CPC ...... B62D 12/00; B62D 6/001; B62D 15/021; E01C 19/26; E02D 3/02; E02D 3/026
USPC .................. 701/41, 50, 54, 70, 72
See application file for complete search history.

(56) References Cited

U.S. PATENT DOCUMENTS

| | | | | |
|---|---|---|---|---|
| 8,781,686 B2* | 7/2014 | Suzuki | .................. | B60W 50/06 701/72 |
| 2005/0234622 A1* | 10/2005 | Pillar | ....................... | G08G 1/20 701/41 |

(Continued)

FOREIGN PATENT DOCUMENTS

| | | |
|---|---|---|
| CN | 101157359 A | 4/2008 |
| CN | 103675320 | 3/2014 |

(Continued)

OTHER PUBLICATIONS

Search Report filed in German Appl. 10 2022 107 761.6 dated Feb. 3, 2023.

(Continued)

*Primary Examiner* — Manglesh M Patel
(74) *Attorney, Agent, or Firm* — RANKIN, HILL & CLARK LLP

(57) ABSTRACT

A method for operating a soil processing machine includes a) providing an extent of steering-driving speed relationship reflecting a maximum permissible driving speed of the soil processing machine as a function of the extent of steering, b) detecting an actual extent of steering of the soil processing machine, c) setting a driving speed of the soil processing machine in such a way that the driving speed does not exceed the maximum permissible driving speed assigned to the actual extent of steering in accordance with the extent of steering-driving speed relationship provided in measure a).

14 Claims, 2 Drawing Sheets

(56) References Cited

U.S. PATENT DOCUMENTS

| | | | |
|---|---|---|---|
| 2013/0079996 A1* | 3/2013 | Bunker | B60R 21/0132 |
| | | | 701/1 |
| 2016/0031444 A1* | 2/2016 | Fairgrieve | B60W 40/04 |
| | | | 701/93 |
| 2016/0039455 A1* | 2/2016 | Zeller | B62D 6/001 |
| | | | 701/41 |
| 2016/0244091 A1* | 8/2016 | Oetken | E01C 19/23 |
| 2016/0280256 A1* | 9/2016 | Wei | B62D 5/0469 |
| 2017/0175659 A1* | 6/2017 | Sunahara | F02D 17/02 |
| 2017/0240182 A1* | 8/2017 | Hatano | B60W 30/16 |
| 2017/0349174 A1* | 12/2017 | Brandin | B60W 30/143 |
| 2018/0057043 A1* | 3/2018 | Toko | B62D 3/12 |
| 2018/0080399 A1* | 3/2018 | Jun | F02D 41/12 |
| 2018/0312161 A1* | 11/2018 | Asakura | B60W 30/09 |
| 2018/0338407 A1* | 11/2018 | Matsuzaki | B60T 7/18 |
| 2019/0126926 A1* | 5/2019 | Maynard | G05D 1/0061 |
| 2019/0226178 A1* | 7/2019 | Nakano | E02F 3/841 |
| 2019/0315396 A1* | 10/2019 | Yamamoto | B62D 15/0265 |
| 2020/0189591 A1* | 6/2020 | Mellinger, III | B62D 6/003 |
| 2021/0078630 A1* | 3/2021 | Hudson | B62D 9/00 |
| 2023/0326263 A1* | 10/2023 | Laugwitz | E01C 19/26 |
| | | | 701/33.4 |
| 2024/0239406 A1* | 7/2024 | Aso | B62D 15/025 |

FOREIGN PATENT DOCUMENTS

| | | |
|---|---|---|
| CN | 204354839 U | 5/2015 |
| CN | 107792264 B | 9/2019 |
| CN | 110331639 | 10/2019 |
| CN | 113152215 | 7/2021 |
| DE | 10 2019 127 640 | 4/2020 |
| DE | 112019004206 | 6/2021 |
| EP | 1985576 | 10/2008 |
| EP | 3115332 B1 | 9/2018 |
| JP | 2002113048 A | 4/2002 |
| WO | 2000032462 A1 | 6/2000 |

OTHER PUBLICATIONS

European Search Report filed in European Appl. 23159282.5 dated Jul. 20, 2023.
CN Office action filed in 202310334386.9 filed Jun. 28, 2025.
Search report filed in 202310334386.9 dated Jun. 26, 2025.

* cited by examiner

METHOD FOR OPERATING A SOIL PROCESSING MACHINE

The present invention relates to a method for operating a soil processing machine. DE 10 2019 127 640 A1 discloses a method for operating a soil processing machine designed as a soil compactor, in which a maximum steering angle, at which the soil processing machine can be steered in a cornering steering state, is specified as a function of the driving speed of the soil processing machine. As the driving speed increases, the maximum steering angle, i.e., the maximum extent to which the soil processing machine can be steered, is reduced. The risk of the soil processing machine tipping over when turned in excessively at high driving speeds is thus avoided. Furthermore, an excessively uneven load due to the centrifugal forces occurring in a cornering steering state, which a roller unit of such a soil processing machine exerts in its curve inner area and its curve outer area on the soil to be processed, for example to be compacted, is avoided, by which uneven soil processing behavior in the direction of a roller axis of rotation is also avoided.

It is the object of the present invention to provide a method for operating a soil processing machine, such as a soil compactor, using which a high level of efficiency in soil processing is obtained with increased operational reliability.

According to the invention, this object is achieved by a method for operating a soil processing machine, wherein the soil processing machine comprises two roller units arranged at a distance from one another in a machine longitudinal direction, wherein each of the two roller units is rotatable around a roller axis of rotation, wherein the two roller units are pivotable with respect to one another in order to steer the soil processing machine, wherein in a straight-ahead steering state corresponding to a steering state of the soil processing machine with a minimum extent of steering, the roller axes of rotation of the two roller units are oriented essentially in parallel to one another, and in a cornering steering state corresponding to a steering state of the soil processing machine having an extent of steering differing from the minimum extent of steering, the roller axes of rotation of the two roller units have an orientation with respect to one another that deviates from a parallel orientation, wherein the method comprises the following measures:

a) providing an extent of steering-driving speed relationship reflecting a maximum permissible driving speed as a function of the extent of steering, b) detecting an actual extent of steering of the soil processing machine, c) setting a driving speed of the soil processing machine in such a way that the driving speed does not exceed the maximum permissible driving speed assigned to the actual extent of steering in accordance with the extent of steering-driving speed relationship provided in measure a).

In a departure from the teaching known from the prior art, the method according to the invention does not take into consideration the driving speed of a soil processing machine, but rather the extent of steering as a reference variable. This has the result that a soil processing machine operated in this way can be steered to any extent, up to a maximum possible extent of steering of the soil processing machine, independently of the driving speed. A potentially safety-critical state therefore cannot occur, in which such a soil processing machine is to be steered into a specific area of the soil to be processed, but this is not possible due to a speed-dependent limitation of the extent of steering, while an operator expects the machine to be able to enter this area and be moved past an obstacle, for example.

Furthermore, the method according to the invention allows the maximum extent of steering possible with such a soil processing machine to be used at any time, independently of the driving speed, so that any area of the soil to be processed reachable using the maximum extent of steering can also be driven over. It is not necessary to make a plurality of additional passes due to a restriction of the extent of steering in order to move the soil processing machine into an area of the soil to be processed which could be reached with a single pass or a smaller number of passes without limiting the extent of steering.

If, during operation of a soil processing machine, a state is reached in which the driving speed is above the maximum permissible driving speed associated with the actual extent of steering of the soil processing machine, the driving speed can be reduced according to the invention in measure c) in such a way that the driving speed essentially corresponds to the maximum permissible driving speed assigned to the actual extent of steering.

If the soil processing machine returns to a steering state that does not require a previously specified limitation of the driving speed or no longer to the extent performed, it can be provided that if, after reducing the driving speed to the maximum permissible driving speed assigned to the actual extent of steering of the soil processing machine, the steering state is changed in the direction of a steering state having a lesser extent of steering:

the driving speed is increased to the maximum permissible driving speed assigned to the steering state having a lesser extent of steering if the driving speed existing before the reduction of the driving speed is higher than the maximum permissible driving speed assigned to the steering state having a lesser extent of steering, or the driving speed is increased to the driving speed existing before the reduction of the driving speed if the driving speed existing before the reduction of the driving speed is less than the maximum permissible driving speed assigned to the steering state having a lesser extent of steering.

In a procedure that is easy to implement and does not require the interaction of an operator, the driving speed can be automatically increased to the maximum permissible driving speed assigned to the steering state having a lesser extent of steering or to the driving speed that existed before the reduction of the driving speed if the steering state changes in the direction of the steering state having a lesser extent of steering.

Alternatively, it can be provided that the driving speed is increased to the maximum permissible driving speed assigned to the steering state with a smaller extent of steering or to the driving speed that existed before the driving speed was reduced when the steering state changes in the direction of the steering state with a smaller extent of steering only if a speed increase confirmation exists. Such a speed increase confirmation can be generated, for example, by a manipulation to be performed on the part of an operator of a confirmation element provided for this purpose, for example a switch or the like, so that an increase of the driving speed actually only occurs if the operator allows it and therefore the operator cannot be surprised by a suddenly occurring increase in speed.

If the driving speed of the soil processing machine is to be increased, starting from a driving speed below the maximum permissible driving speed assigned to the actual extent of steering, to a target driving speed above the maximum permissible driving speed assigned to the actual extent of steering, to avoid an excessive driving speed in measure c) the driving speed of the soil processing machine can be increased in such a way that it essentially corresponds to the maximum permissible driving speed assigned to the actual extent of steering, so that the fundamentally specified target driving speed is initially not reached.

If, after increasing the driving speed to the maximum permissible driving speed assigned to the actual extent of steering, the steering state is changed towards a steering state with a lesser extent of steering:

the driving speed can be increased in such a way that it essentially corresponds to the maximum permissible driving speed assigned to the steering state having a lesser extent of steering if the target driving speed is higher than the maximum permissible driving speed assigned to the steering state having a lesser extent of steering, or the driving speed can be increased in such a way that it essentially corresponds to the target driving speed if the target driving speed is less than the maximum permissible driving speed assigned to the steering state having a lesser extent of steering.

Upon such a return to a steering state having a lesser extent of steering, the driving speed can also be increased automatically to the maximum permissible driving speed assigned to the steering state having a lesser extent of steering or the target driving speed when the steering state changes in the direction of the steering state having a lesser extent of steering.

Alternatively, to increase the operational reliability, the driving speed can be increased to the maximum permissible driving speed assigned to the steering state with a smaller extent of steering or to the target driving speed when the steering state changes in the direction of the steering state having a lesser extent of steering only if a speed increase confirmation exists.

In an embodiment of the extent of steering-driving speed relationship that is easy to implement and ensures a high level of operational reliability, the maximum permissible driving speed can decrease essentially linearly as the extent of steering increases, at least in one range of the driving speed.

A restriction of the driving speed in a state in which this is actually not necessary can be avoided in that the maximum permissible driving speed corresponds to a maximum possible driving speed of the soil processing machine when the extent of steering is below a threshold extent of steering.

Since there is essentially no risk of tipping over or uneven loading of the soil to be processed by a roller unit even at a comparatively low driving speed, it can furthermore be provided that when the driving speed is below a threshold driving speed, there is no change in the driving speed as a function of an extent of steering.

The extent of steering can be determined, for example, based on an positioning state of at least one steering actuator. Such a steering actuator can be designed, for example, as a piston/cylinder unit, which acts between a machine frame of a soil processing machine and a roller frame pivotably supported thereon and rotatably supporting a roller unit. The positioning state of such a steering actuator can be detected and this information can be used to determine the extent of steering. Alternatively or additionally, the extent of steering can be determined based on an extent of actuation of a steering actuating element such as a steering wheel or a joystick. This extent of actuation can also be detected by means of a corresponding sensor system, and this information can be used to determine the extent of steering.

The driving speed can be determined, for example, based on a rotational speed of at least one of the roller units. Alternatively or additionally, the driving speed can be determined based on an positioning state of a hydraulic drive system for at least one of the roller units. Such a hydraulic drive system generally comprises one or more hydraulic pumps and at least one hydraulic motor assigned to each driven roller unit. The hydraulic motor and/or the hydraulic pump that feeds it can work with a variable displacement volume or variable delivery volume in order to be able to adjust the quantity of the circulating fluid to specify the driving speed. The positioning state of such a hydraulic motor or such a hydraulic pump or the delivery quantity of the fluid flowing through them are thus linked to the driving speed of a soil processing machine. In a further variant, the driving speed can be determined based on an positioning state of a driving actuating element. As long as there is no control intervention or regulation intervention to reduce the driving speed, there is also an essentially unambiguous relationship between the positioning state of a driving actuating element, for example a driving lever to be actuated by an operator, and the driving speed of a soil processing machine. However, the positioning state of such a driving actuating element can be taken into consideration as a parameter representing a target driving speed actually specified by an operator, in particular when an intervention to reduce the driving speed has taken place. In a further option for determining the driving speed, it can be determined based on position information provided by a position detection system. Such a position detection system can, for example, be satellite-based, such as GPS. With the position information, by determining the change in the position of a soil processing machine, its speed can be inferred.

The present invention is described in detail below with reference to the attached figures.

Figure 1:
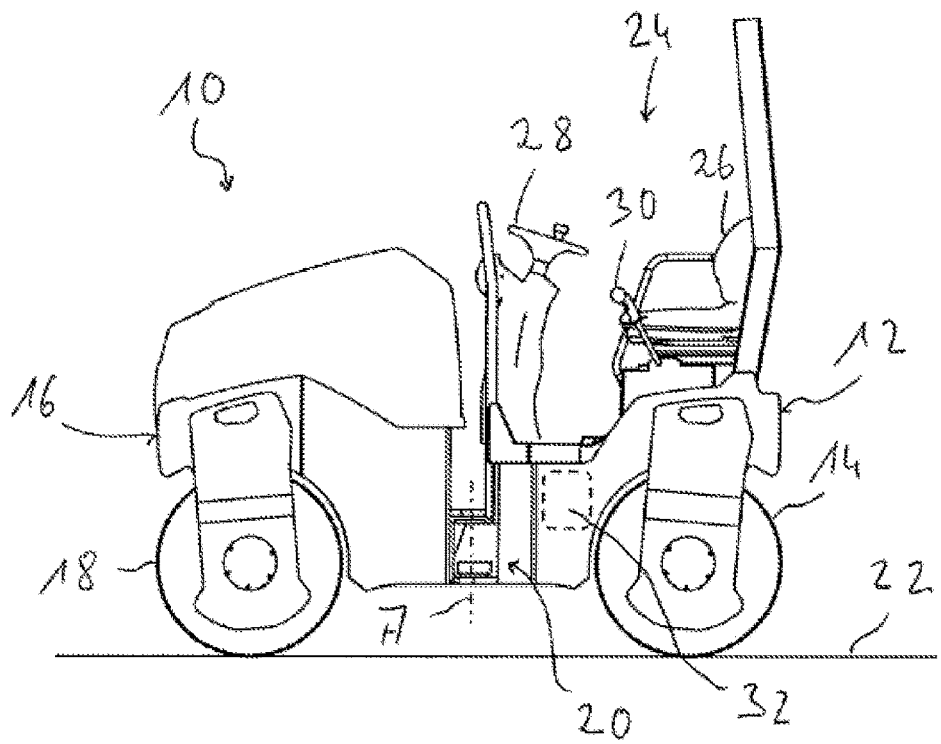
FIG. 1 shows a side view of a soil processing machine designed as a soil compactor.

In FIG. 1, a soil processing machine designed as a soil compactor is generally designated by 10. The soil processing machine 10 comprises a roller unit 14, which is designed as a compactor roller in the example shown, on a rear carriage 12, and comprises a roller unit 18, designed as a compactor roller, on a front carriage 16. Each of the roller units 14, 18 is rotatably supported around an associated roller axis of rotation on the rear carriage 12 or on the front carriage 16, respectively. For example, each of the roller units 14, 18 can be driven to rotate around the respective assigned roller axis of rotation.

In the exemplary embodiment shown, each of the roller units 14, 18 is constructed having a roller shell made of steel material. In an alternative embodiment, one or both roller units 14, 18 could be divided in the direction of the respective roller axis of rotation or could comprise a plurality of rubber wheels in succession in the direction of the roller axis of rotation.

The rear carriage 12 and the front carriage 16 are pivotably connected to one another around a steering axis A in the area of an articulated joint 20. The steering axis A can be oriented essentially orthogonally to the ground 22 on which the soil processing machine 10 is moving, but can also have an angular position that deviates from an orthogonal orientation and/or has a changing angular position with respect to the ground 22 when a steering operation is carried out.

On the rear carriage 12, a control stand, generally designated by 24, is provided for an operator. A seat 26 for the operator is arranged on the control stand 24. Furthermore, a steering actuating element 28 embodied as a steering wheel in the illustrated example is provided on the control stand 24. By actuating the steering actuating element 28, a steering system is activated, which pivots the front carriage 16 with respect to the rear carriage 12, so that, starting from a straight-ahead driving state in which the axes of rotation of the two roller units 14, 18 are essentially in parallel to one another, the rear carriage 12 and the front carriage 16 are angled with respect to one another and accordingly the axes of rotation of the two roller units 14, 18 also enter an angled state relative to one another.

A driving actuating element 30 embodied, for example, as a driving lever is also provided on the control stand 24. By pivoting the driving actuating element 30, an operator can specify a speed at which the soil processing machine 10 is moved over the soil 22 to be processed. Depending on the extent to which the driving actuating element 30 is actuated, a generally hydraulically operated traction drive system is activated in order to drive one or both of the roller units 14, 18 to rotate around the respective assigned roller axis of rotation.

The soil processing machine 10 furthermore comprises an activation unit, generally designated by 32. The activation unit 32 receives, for example, information about the extent of the actuation of the steering actuating element 28 and the extent of the actuation of the driving actuating element 30 and controls the corresponding system areas, i.e., a steering system or a traction drive system, according to the extent of the actuation detected in each case, in order to move the soil processing machine 10 at the speed specified by an operator in the direction specified by the operator. The activation unit 32 can comprise one or more programmable microprocessors, which, while processing stored control programs and taking into consideration inputs indicating various parameters, such as a driving speed or an extent of steering, activates various system areas of the soil processing machine 10 in order to carry out a soil processing operation intended for them.

Figure 2:
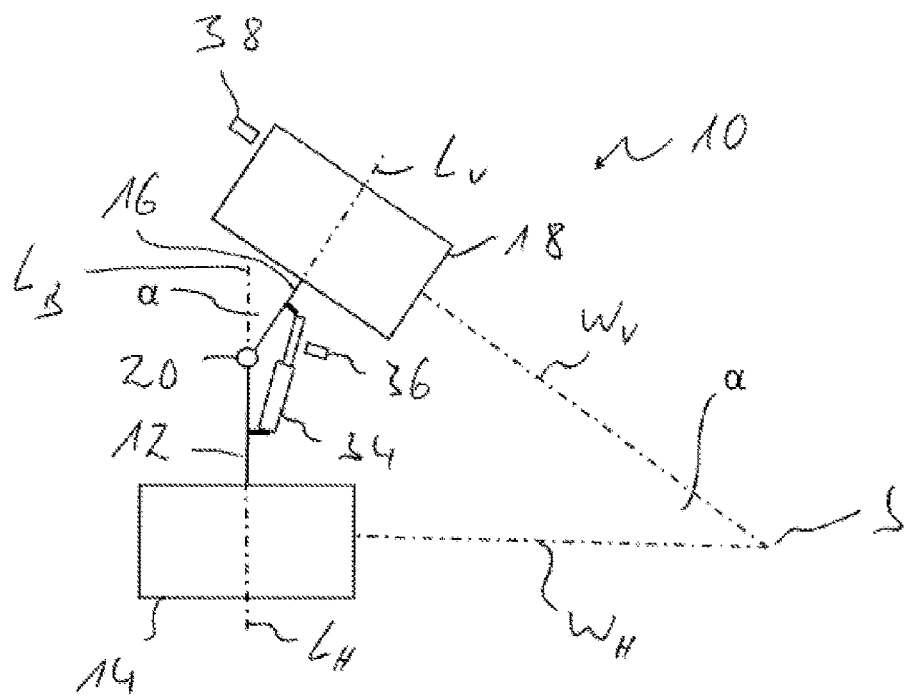
FIG. 2 shows a schematic illustration of a soil processing machine in a cornering steering state.

Such a soil processing machine 10 is schematically shown in FIG. 2. The rear carriage 14, which is elongated in the direction of a longitudinal axis $L_H$ of the rear carriage, can be seen, on which the roller unit 14 is rotatably carried around the roller axis of rotation $W_H$ assigned thereto. Likewise, on the front carriage 16 extending in the direction of a front carriage longitudinal axis $L_V$, the roller unit 18 is rotatable around the roller axis of rotation $W_V$ assigned thereto. The respective longitudinal axis $L_H$ or $L_V$ can be viewed in each case as an axis or extension direction of the rear carriage 14 or the front carriage 16 that is orthogonal to the roller axis of rotation $W_H$, $W_V$. Furthermore, the rear carriage longitudinal axis $L_H$ can also be viewed fundamentally as the longitudinal axis $L_B$ of the soil processing machine 10.

A steering actuator 34 acting between the rear carriage 14 and the front carriage 16 can be seen in FIG. 2. In the exemplary embodiment shown, the steering actuator 34 is designed as a piston/cylinder unit, which is changeable in its longitudinal extension by supplying or discharging pressure fluid and at the same time triggers a pivoting movement of the front carriage 16 with respect to the rear carriage 14 in the area of the articulated joint 20. For reasons of stability, for example, two steering actuators 34 provided on both sides of the articulated joint 20 and acting between the rear carriage 14 and the front carriage 16 can be provided.

At least one such steering actuator 34 can be assigned a steering sensor 36 which detects the positioning state of the steering actuator 34. This positioning state of the steering actuator 34 essentially represents the steering state or the extent of steering with which the soil processing machine 10 is steered in a cornering state. In particular, such a extent of steering can be viewed as the angle α, recognizable in FIG. 2, between the longitudinal axis $L_B$ of the soil processing machine or the rear carriage longitudinal axis $L_H$ and the front carriage longitudinal axis $L_V$. In a straight-ahead steering state, which corresponds to a steering state having a minimum extent of steering, the angle α is equal to zero. It can be seen in FIG. 2 that the angle α is also depicted between the roller axes of rotation $W_H$, $W_V$, which are not oriented parallel to one another in a cornering steering state, i.e., a steering state having a extent of steering deviating from the minimum extent of steering. If the two roller units 14, 18 have the same diameter, the roller axes of rotation $W_V$, $W_H$ intersect at a point of intersection S. If the roller units 14, 18 have different diameters from one another, the roller axes of rotation $W_V$, $W_H$ projected onto the ground 22 intersect in this point of intersection S.

The driving speed of the soil processing machine 10 can be detected, for example, by a speed sensor 38 which detects the rotational speed of one of the roller units 14, 18, in the example shown the roller unit 18. Since there is essentially no slippage with respect to the soil 22 to be processed during operation of such a soil processing machine 10, it can be assumed that the rotational speed of, for example, the roller unit 18 is clearly linked to the driving speed of the soil processing machine 10. Alternatively, the driving speed could also be derived from the positioning state of the hydraulically acting traction drive system or the positioning state of the driving actuating element 30.

Figure 3:
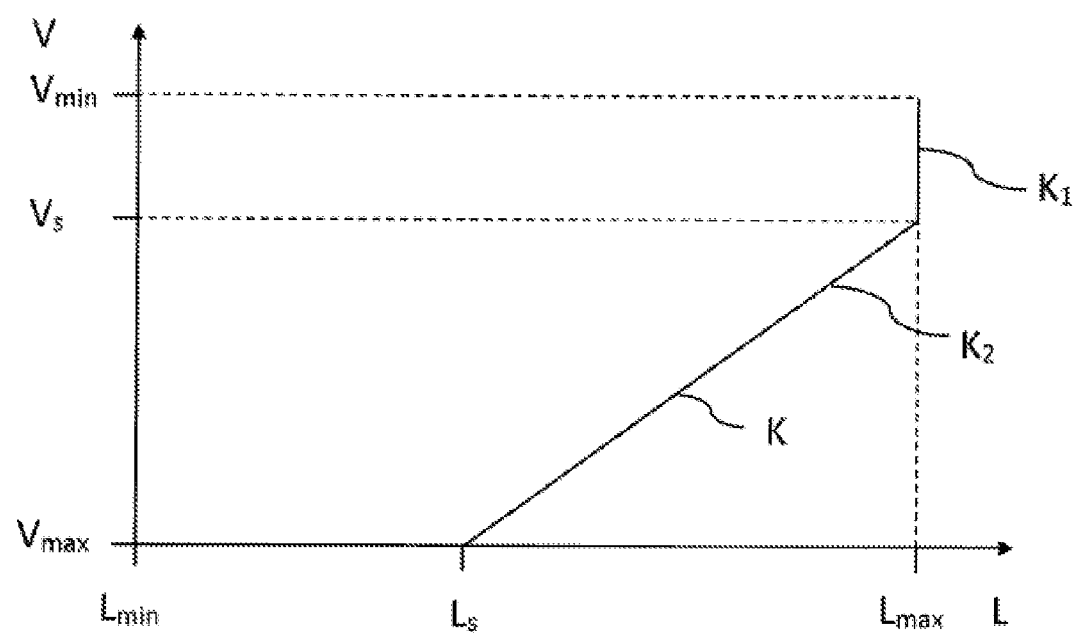
FIG. 3 shows an extent of steering-driving speed diagram with an extent of steering-driving speed relationship.

According to the present invention, the soil compactor 10 is operated in such a way that in principle there is a relationship between the maximum permissible driving speed of the soil processing machine 10 and the steering state, i.e., for example, the extent to which the front carriage 16 is kinked in the area of the articulated joint 20 with respect to the rear carriage 14. which in turn is represented by the angle α. FIG. 3 shows a relationship between the extent of steering L, represented for example by the steering angle α, and the driving speed V of the soil processing machine 10. In particular, FIG. 3 shows on the basis of the curve K a relationship between the extent of steering and the driving speed, which specifies the maximum permissible driving speed at which the soil processing machine 10 can be operated as a function of the respective existing steering state or extent of steering. This extent of steering that is actually present and detected, for example, by the steering sensor 36 and represented by the angle α is regarded as the actual extent of steering.

FIG. 3 shows that the soil processing machine 10 can fundamentally be operated at a speed between a minimum speed $V_{min}$ and a maximum driving speed $V_{max}$. The minimum driving speed $V_{min}$ can, for example, correspond to a driving speed of 0 km/h, that is to say a state of a standstill. The maximum driving speed $V_{max}$ can be, for example, the maximum possible driving speed and can have a value of approximately 20 km/h. In principle, it could also be provided that the maximum driving speed $V_{max}$ can be limited by an operator to a value below the maximum possible driving speed.

The extent of steering L can be adjusted between a minimum extent of steering $L_{min}$, i.e., a steering angle α of 0° or a straight-ahead steering state, and a maximum extent of steering $L_{max}$ which, for example, can be in the range of approximately 35° when considering the angle α as the steering angle or extent of steering.

The relationship between the extent of steering and the driving speed represented by the curve K can fundamentally be broken down into two ranges $K_1$ and $K_2$. The range $K_1$ is assigned to a range of comparatively low driving speed of the soil processing machine 10, in which it is operated at a driving speed below a threshold driving speed $V_s$ of, for example, approximately 5 km/h. In this speed range, there is no critical relationship between the extent of steering and the driving speed, so that for each driving speed in this speed range, the maximum extent $L_{max}$ can be selected if desired, or the maximum permissible driving speed is not restricted as a function of the extent of steering L.

If the driving speed V exceeds the threshold driving speed $V_s$, the maximum permissible driving speed decreases as the extent of steering L increases according to the range of the extent of steering-driving speed relationship K represented by the range $K_2$. When the extent of steering L is in the range of a threshold extent of steering $L_s$, the maximum permissible driving speed corresponds to the maximum or maximum possible driving speed $V_{max}$ of the soil processing machine 10. With the extent of steering increasing in the direction toward the maximum extent of steering $L_{max}$, the maximum permissible driving speed increases up to the threshold driving speed $V_s$, which is then specified as the maximum permissible driving speed when the extent of steering reaches the maximum extent of steering $L_{max}$.

If the soil processing machine 10 is only steered to a comparatively small extent, which means that in the example shown the extent of steering is below the threshold extent of steering $L_s$, it is not necessary to limit the driving speed, so that if the extent of steering L is below the threshold extent of steering $L_s$, the soil processing machine 10 can, if desired, be moved over the soil 22 to be processed at a driving speed $V_{max}$.

Taking into consideration the extent of steering-driving speed relationship shown in FIG. 3 and represented by the curve K, the soil processing machine 10 can be operated in such a way that when, for example, starting from a straight-ahead steering state, i.e., a steering state with minimum extent of steering $L_{min}$, it is moved over the ground 22 at a driving speed which is in the range between the threshold driving speed $V_s$ and the maximum driving speed $V_{max}$, there is no intervention in the driving speed as long as the extent of steering is below the threshold extent of steering $L_s$ and/or the driving speed V specified according to the actuation of the driving actuating element 30 does not exceed the maximum permissible driving speed assigned to the respective current actual extent of steering.

If the steering state is changed in the direction of a steering state with a greater extent of steering, this can result in the current driving speed exceeding or being above the maximum permissible driving speed assigned to the steering state with a greater extent of steering. As a result, the traction drive system is activated by the activation unit 32 in such a way that the driving speed is reduced until it corresponds in the range to the maximum permissible driving speed assigned for the then existing actual steering state. This is done, for example, by intervening in the hydraulic traction drive system by reducing the delivery volume of one or more hydraulic pumps and/or reducing the displacement volume of one or more hydraulic motors. If the steering actuating element 28 is actuated in such a state in the direction of further steering in, i.e., further increasing the extent of steering L, this results in a further reduction in the driving speed V to the maximum permissible driving speed assigned to the then existing actual steering state. If, starting from such a state in which the driving speed was reduced due to a comparatively large actual extent of steering, the extent of steering is reduced again, the driving speed can also be increased again accordingly, possibly up to the driving speed that has been specified, before initiating the reduction of the driving speed, by the corresponding extent of the actuation of the driving actuating element 30 by means of an operator. This means that as the extent of steering decreases, the driving speed is automatically increased in accordance with the increasing maximum permissible driving speed, for example until the value of the driving speed specified before the intervention to reduce the driving speed is reached again. As long as the maximum permissible driving speed specified as a function of the actual steering state is still below the driving speed specified before the intervention in the speed, the driving speed can only be increased to the maximum permissible driving speed associated with the respective current actual extent of steering. Only when this is below the previously existing driving speed can this previously existing driving speed also be set again.

Alternatively to this automatic return of the driving speed to the value of the driving speed existing before the control intervention, it is possible to allow or release an increase in the driving speed only if this is also actually confirmed by an operator operating the soil processing machine 10. For this purpose, an actuating element designed, for example, in the form of a switch, a push button, or the like can be provided on the control stand 24, via which an operator can input a speed increase confirmation, whereupon the traction drive system is then operated under the activation of the activation unit 32 in such a way that the speed is increased again, for example to the driving speed specified or existing before the intervention to reduce the driving speed. In order to indicate to the operator that the driving speed can be increased again, it can be provided, for example, that when the extent of steering has been reduced again to such a value that the driving speed that existed before the intervention can be reached again, corresponding information can be displayed, for example, on a display, so that the operator can then release the speed increase by manipulating the actuating element.

If the soil processing machine 10 is operated in a cornering steering state, i.e., a state having a steering angle α other than zero, and the speed of the soil processing machine 10 is increased in such a steering state in such a way that would exceed the maximum permissible driving speed assigned to the steering state or the actual extent of steering, since the target driving speed specified according to the extent of actuation of the driving actuating element 30 is above the maximum permissible driving speed specified for the existing actual steering state, the driving speed is only increased until the maximum permissible driving speed for this actual steering state is reached. If the steering actuating element 28 is actuated to increase the extent of steering, this also results in a reduction in the maximum permissible driving speed, which in turn results in an intervention in the traction drive system to reduce the driving speed to the then existing maximum permissible driving speed. If, starting from such a state, the steering actuating element 28 is actuated in the direction of a smaller extent of steering, the maximum permissible driving speed increases, so that the driving speed of the soil processing machine 10 can then automatically be increased in the direction of the target driving speed specified according to the actuation of the driving actuating element 30. However, as long as the maximum permissible driving speed is below this target driving speed, the maximum permissible driving speed is also actually not exceeded. Only when the maximum permissible driving speed falls below the target driving speed due to further reduction of the extent of steering, i.e., a smaller actual extent of steering, can the speed be increased to the target driving speed and the soil processing machine 10 can be moved in accordance with the target driving speed specified by the extent of the actuation of the driving actuating element 30.

Alternatively to this automated increase of the driving speed to the target driving speed, i.e., specified without the interaction of an operator, it can also be provided here that when the extent of steering is reduced, a change of the driving speed, starting from the initially throttled driving speed that is below the target driving speed, namely the initially specified maximum permissible driving speed, is only increased if a corresponding speed increase confirmation is performed by means of an operator by manipulating an actuating element provided for this purpose It could also be provided here, for example, that if the soil processing machine 10 can also actually be moved at the target driving speed due to the existing actual steering state, this is signaled to the operator acoustically or visually, so that he can then release the increase of the driving speed by manipulating the actuating element.

Using the procedure according to the invention, in which the extent of steering is used as a reference variable for the maximum permissible driving speed in a range of the extent of steering and a range of the driving speed, potentially critical driving situations that could result in the soil processing machine tipping over or at least result in uneven soil processing behavior are generally avoided. Nevertheless, the soil processing machine remains steerable to the maximum extent, so that situations in which a soil processing machine can no longer be moved into a desired area due to limited steerability or can be moved past an obstacle are avoided.

It is to be noted that such a procedure can also be used with differently structured soil processing machines, for example with soil processing machines in which a steering movement takes place in that each of the two roller units is pivotably supported via a respective steering bolster on a central machine frame of the soil processing machine. Other parameters can also be used to provide information about the driving speed or the extent of steering. For example, the driving speed can be determined by changing the information about the position of a soil processing machine that is provided, for example, via a satellite-supported position detection system. The extent of steering can also be derived from the actuation of a steering actuating element, which can be detected by a sensor system assigned to such a steering actuating element.

The extent of steering-driving speed relationship can have a different profile than the linear profile shown in FIG. 3, in particular in the range in which permissible driving speed varies with the extent of steering. For example, a step-like profile could be selected here, as well as a parabolic or asymptotic progression. It is also to be noted that the extent of steering-driving speed relationship does not necessarily have to be stored in the form of a diagram, as is shown in FIG. 3. It could also be provided in the form of one or more mathematical formulas or a characteristic map.

The invention claimed is:

1. A method for operating a soil processing machine, wherein the soil processing machine comprises two roller units arranged at a distance from one another in a machine longitudinal direction, wherein each of the two roller units is rotatable around a roller axis of rotation, wherein the two roller units are pivotable with respect to one another in order to steer the soil processing machine, wherein in a straight-ahead steering state corresponding to a steering state of the soil processing machine with a minimum extent of steering, the roller axes of rotation of the two roller units are oriented parallel to one another, and in a cornering steering state corresponding to a steering state of the soil processing machine having an extent of steering differing from the minimum extent of steering, the roller axes of rotation of the two roller units have an orientation with respect to one another that deviates from a parallel orientation, wherein the method comprises following measures:
   a) providing an extent of steering-driving speed relationship reflecting a maximum permissible driving speed as a function of the extent of steering,
   b) detecting an actual extent of steering of the soil processing machine,
   c) adjusting a driving speed of the soil processing machine such that the driving speed does not exceed the maximum permissible driving speed assigned to the actual extent of steering detected in measure b) in accordance with the extent of steering-driving speed relationship provided in measure a).

2. The method as claimed in claim 1,
   wherein if the driving speed is above the maximum permissible driving speed assigned to the actual extent of steering of the soil processing machine, the driving speed is reduced in measure c) such that the driving speed corresponds to the maximum permissible driving speed assigned to the actual extent of steering.

3. The method as claimed in claim 2,
   wherein if, after decreasing the driving speed to the maximum permissible driving speed assigned to the actual extent of steering, the steering state is changed toward a steering state with a lesser extent of steering:
   the driving speed is increased to the maximum permissible driving speed assigned to the steering state having a lesser extent of steering if the driving speed existing before the reduction of the driving speed is higher than the maximum permissible driving speed assigned to the steering state having a lesser extent of steering, or
   the driving speed is increased to the driving speed existing before the reduction of the driving speed if the driving speed existing before the reduction of the driving speed is less than the maximum permissible driving speed assigned to the steering state having a lesser extent of steering.

4. The method as claimed in claim 3,
   wherein the driving speed is increased automatically to the maximum permissible driving speed assigned to the steering state with a lesser extent of steering or to the driving speed that existed before the driving speed was reduced when the steering state changes toward the steering state with a lesser extent of steering.

5. The method as claimed in claim 3,
   wherein the driving speed is increased to the maximum permissible driving speed assigned to the steering state with a lesser extent of steering or to the driving speed that existed before the driving speed was reduced when the steering state changes toward the steering state with a lesser extent of steering only when a speed increase confirmation is present.

6. The method as claimed in claim 1,
wherein if the driving speed of the soil processing machine is to be increased, starting from a driving speed below the maximum permissible driving speed assigned to the actual extent of steering, to a target driving speed above the maximum permissible driving speed assigned to the actual extent of steering, in measure c) the driving speed of the soil processing machine is increased such that the driving speed corresponds to the maximum permissible driving speed assigned to the actual extent of steering.

7. The method as claimed in claim 6,
wherein if, after increasing the driving speed to the maximum permissible driving speed assigned to the actual extent of steering, the steering state is changed toward a steering state with a lesser extent of steering:
the driving speed is increased such that the driving speed corresponds to the maximum permissible driving speed assigned to the steering state having a lesser extent of steering if the target driving speed is higher than the maximum permissible driving speed assigned to the steering state having a lesser extent of steering, or
the driving speed is increased such that the driving speed corresponds to the target driving speed if the target driving speed is less than the maximum permissible driving speed assigned to the steering state having a lesser extent of steering.

8. The method as claimed in claim 7,
wherein the driving speed is increased automatically to the maximum permissible driving speed assigned to the steering state with a lesser extent of steering or to the target driving speed when the steering state changes toward the steering state with a lesser extent of steering.

9. The method as claimed in claim 7, wherein the driving speed is increased to the maximum permissible driving speed assigned to the steering state with a lesser extent of steering or to the target driving speed when the steering state changes toward the steering state with a lesser extent of steering only when a speed increase confirmation is present.

10. The method as claimed in claim 1,
wherein that at least in one range of the driving speed, the maximum permissible driving speed decreases linearly with increasing extent of steering.

11. The method as claimed in claim 1,
wherein when the extent of steering is below a threshold extent of steering, the maximum permissible driving speed corresponds to a maximum driving speed.

12. The method as claimed in claim 1,
wherein when the driving speed is below a threshold driving speed, there is no change in the driving speed dependent on an extent of steering.

13. The method as claimed in claim 1,
wherein the extent of steering is determined based on a positioning state of at least one steering actuator, and/or in that the extent of steering is determined based on an extent of actuation of a steering actuating element.

14. The method as claimed in claim 1,
wherein the driving speed is determined based on a rotational speed of at least one of the roller units and/or in that the driving speed is determined based on a positioning state of a hydraulic drive system for at least one of the roller units, and/or in that the driving speed is determined based on an positioning state of a driving actuating element, and/or in that the driving speed is determined based on position information provided by a position detection system.

* * * * *